United States Patent
Kosuda

(10) Patent No.: US 10,048,910 B2
(45) Date of Patent: Aug. 14, 2018

(54) INFORMATION PROCESSING DEVICE PERFORMING INFORMATION PROCESSING IN RESPONSE TO RECEIVING INFORMATION PROCESSING REQUEST AND REQUEST DESTINATION INFORMATION, AND INFORMATION PROCESSING SYSTEM WITH THE DEVICE

(71) Applicant: Oki Data Corporation, Tokyo (JP)

(72) Inventor: Shota Kosuda, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/486,420

(22) Filed: Apr. 13, 2017

(65) Prior Publication Data
US 2017/0300277 A1 Oct. 19, 2017

(30) Foreign Application Priority Data

Apr. 14, 2016 (JP) .................................. 2016-080778

(51) Int. Cl.
| | |
|---|---|
| *G06F 15/00* | (2006.01) |
| *G06F 3/12* | (2006.01) |
| *G06K 1/00* | (2006.01) |
| *H04L 29/12* | (2006.01) |
| *H04L 12/66* | (2006.01) |
| *H04N 1/00* | (2006.01) |

(52) U.S. Cl.
CPC .......... *G06F 3/1236* (2013.01); *G06F 3/1203* (2013.01); *G06F 3/1286* (2013.01); *H04L 12/66* (2013.01); *H04L 61/1511* (2013.01); *H04L 61/2007* (2013.01); *H04N 1/00244* (2013.01); *H04N 1/00411* (2013.01); *H04N 2201/0094* (2013.01)

(58) Field of Classification Search
CPC .... G06F 3/1236; G06F 3/1203; G06F 3/1286; H04L 12/66; H04L 61/1511; H04L 61/2007; H04N 1/00244; H04N 1/00411; H04N 2201/0094
USPC ............................... 258/1.15, 1.13, 1.14, 1.1
See application file for complete search history.

(56) References Cited

U.S. PATENT DOCUMENTS 9,826,117 B2 * 11/2017 Park ...................... G06F 3/1296
9,826,359 B2 * 11/2017 Splaine ................. H04W 4/023

FOREIGN PATENT DOCUMENTS

JP 2015-223744 A 12/2015

* cited by examiner

*Primary Examiner* — Douglas Tran
(74) *Attorney, Agent, or Firm* — Muncy, Geissler, Olds & Lowe, P.C.

(57) ABSTRACT

An information processing device communicating with a first terminal device through either a wired or wireless network comprises a communication part that transmits a self-address of itself as a management server address to the first terminal device, the self-address being a unique code to identify the information processing device in the network, and receives a first information processing request, which is to cause the information processing device to perform an image processing, and a request destination information, which indicates a request destination of the first information processing request, both of the requests being transmitted from the first terminal device, and a processing part that performs the information processing based on the first information processing request regardless of the request destination indicated by the request destination information.

17 Claims, 10 Drawing Sheets

Fig. 5

| Transmission Source IP Address | Transmission Destination IP Address |
|---|---|
| 192.168.100.2<br>192.168.100.3<br>192.168.100.4<br>⋮ | 10.49.100.1<br>10.49.200.1<br>192.168.100.1<br>⋮ |

16A

INFORMATION PROCESSING DEVICE PERFORMING INFORMATION PROCESSING IN RESPONSE TO RECEIVING INFORMATION PROCESSING REQUEST AND REQUEST DESTINATION INFORMATION, AND INFORMATION PROCESSING SYSTEM WITH THE DEVICE

CROSS REFERENCE TO RELATED APPLICATION

This application claims priority under 35 USC 119 to Japanese Patent Application No. 2016-080778 filed on Apr. 14, 2016 original document, the entire contents which are incorporated herein by reference.

TECHNICAL FIELD

This invention relates to an information processing device that performs information processing based on a received information processing request, and an information processing system used in such an information processing device.

BACKGROUND

For example, often used in a wireless communication system is so-called the SoftAP function (also called the WiFi Direct™ function) that makes a communication device that ordinarily operates as a child device operate as an access point to connect it directly with other communication devices through wireless communication. For example, disclosed in Patent Document 1 is a communication device that has two communication modes of a wireless communication mode (infrastructure mode) to operate as a child device and a wireless communication mode to operate as an access point.

RELATED ART

[Patent Doc. 1] JP Laid-Open Patent Publication 2015-223744

By the way, in general, what is desired to electronic equipment is high convenience for the user, and an information processing device having a communication device is also expected to have high convenience.

It is desirable to offer an information processing device and an information processing system that can enhance user's convenience.

An information processing device, which is disclosed in the application, communicating with a first terminal device through either a wired or wireless network comprises a communication part that transmits a self-address of itself as a management server address to the first terminal device, the self-address being a unique code to identify the information processing device in the network, and receives a first information processing request, which is to cause the information processing device to perform an image processing, and a request destination information, which indicates a request destination of the first information processing request, both of the requests being transmitted from the first terminal device, and a processing part that performs the information processing based on the first information processing request regardless of the request destination indicated by the request destination information.

An information processing system, which is disclosed in the application, includes an information processing device; and a first terminal device, wherein the information processing device comprises a communication part that transmits a self-address of itself as a management server address to the first terminal device, and also receives a first information processing request and request destination information, which indicates a request destination of the first information processing request, both of the requests being transmitted from the first terminal device, and a processing part that performs information processing based on the first information processing request regardless of the request destination indicated by the request destination information.

According to the information processing device and the information processing system of this invention, because the self-address of itself is transmitted to the first terminal device as the management servicer address, the first information processing request and the request destination information transmitted from the first terminal device are received, and information processing is performed based on the first information processing request regardless of the request destination indicated by the request destination information, the user's convenience can be enhanced.

BRIEF DESCRIPTION OF THE DRAWINGS

FIG. 5 is an explanatory diagram showing a configuration example of the address conversion table shown in FIG. 1.

DETAILED DESCRIPTION OF PREFERRED EMBODIMENTS

Below, embodiments of this invention are explained in detail referring to drawings. Note that the explanations are given in the following order.
1. First Embodiment
2. Second Embodiment

1. First Embodiment

[Configuration Example]

Figure 1:
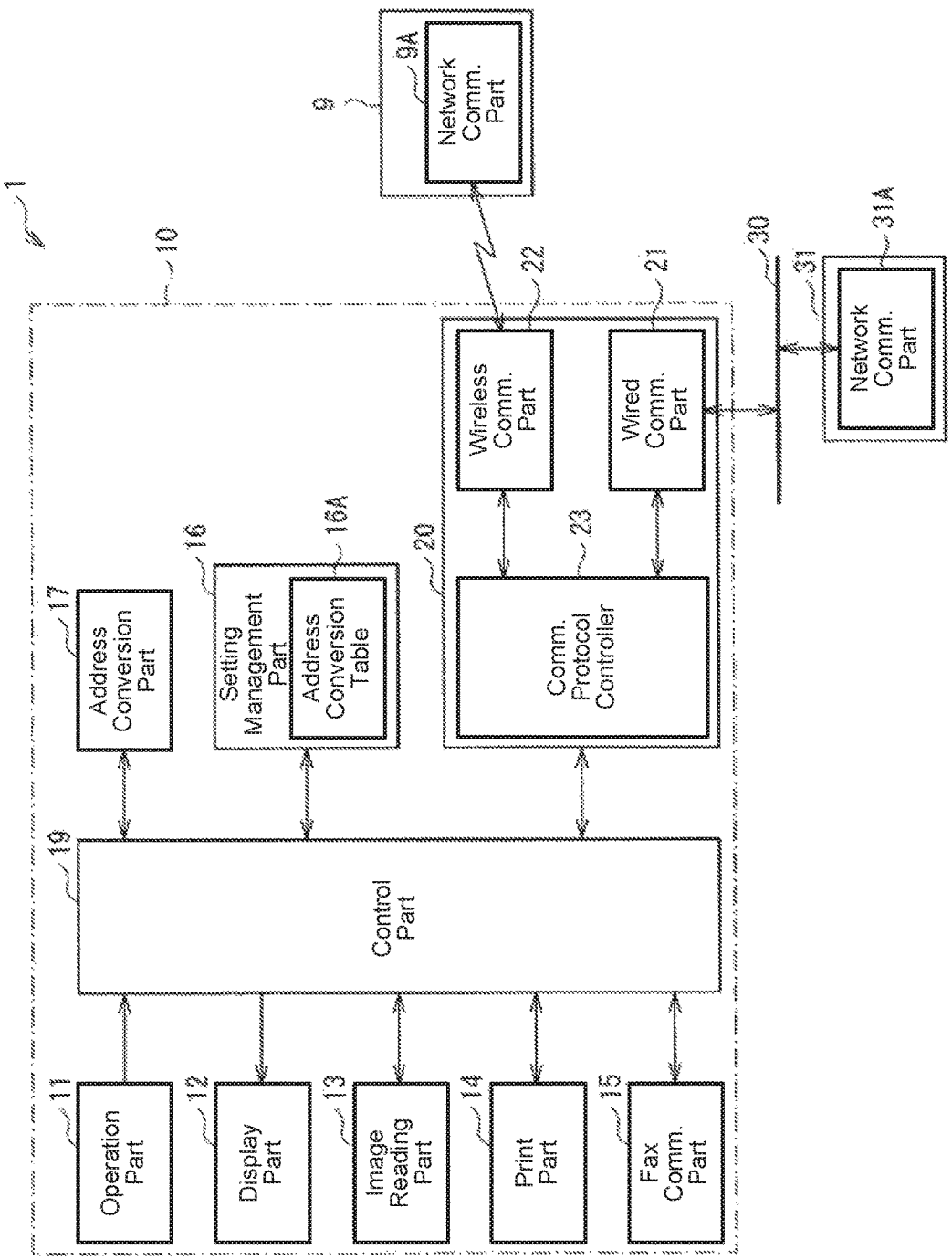
FIG. 1 is a block diagram showing a configuration example of the information processing system of the first embodiment.

Shown in FIG. 1 is a configuration example of an information processing system (information processing system 1) of the first embodiment of this invention. The information processing system 1 is provided with a multifunction peripheral 10, a mobile computer 9, and a computer 31.

The multifunction peripheral 10 is a so-called MFP having functions such as copying, facsimile, and scanning. The multifunction peripheral 10 comprises an operation part 11, a display part 12, an image reading part 13, a print part 14, a FAX communication part 15, a network communication part 20, a setting management part 16, an address conversion part 17, and a control part 19.

The operation part 11 accepts the user's operations, and comprises a touch panel, various kinds of buttons, etc. for example. The display part 12 displays the status of the multifunction peripheral 10 etc., and is configured using a liquid crystal display etc. for example. The image reading part 13 is a so-called scanner that reads information from a manuscript set by the user, and is configured using a CIS (Contact Image Sensor) unit for example. The print part 14 forms an image on a recording medium such as paper based on print data DP supplied from the mobile computer 9 or the computer 31 for example. The print data DP are postscript format data described in a page description language for example. The print part 14 is designed to analyze these print data DP and form an image on the recording medium using a toner for example. The FAX communication part 15 transmits and receives data between it and its communication partner via a telephone line.

The network communication part 20 performs communication with network devices such as computers and various kinds of servers using a wired LAN (Local Area Network) and/or a wireless LAN. The network communication part 20 comprises a wired communication part 21, a wireless communication part 22, and a communication protocol controller 23.

The wired communication part 21 performs wired communication with a network device using the wired LAN. The wired communication part 21 is connected to a network 30. To the network 30, the computer 31 is connected in this example.

The wireless communication part 22 performs wireless communication with a network device using the wireless LAN. The wireless communication part 22 has two communication modes M1 and M2. The communication mode M1 is a mode (infrastructure mode) to operate as a child device and perform communication with a network device via an unshown access point. The communication mode M2 is a mode (SoftAP mode) to operate as an access point and perform direct communication with a network device (the mobile computer 9 in this example). The communication modes M1 and M2 are each set either enabled or disabled for example. In this example, although hereafter the communication mode M1 is set disabled for the convenience of explanation, this invention is not limited to this.

The communication protocol controller 23 controls communication using various kinds of protocols. Specifically, the communication protocol controller 23 controls the network communication part 20 so as to communicate with network devices using protocols such as TCP/IP (Transmission Control Protocol/Internet Protocol) and UDP (User Datagram Protocol). Also, when receiving the print data DP, the communication protocol controller 23 uses protocols such as LPR (Line Printer daemon protocol), Port 9100, IPP (Internet Printing Protocol), and SNMP (Simple Network Management Protocol) to perform processing as these servers.

Also, when the wireless communication part 22 operates in the communication mode M2 (SoftAP mode), the communication protocol controller 23 performs processing as a so-called DHCP server. Specifically, when the wireless communication part 22 operates in the communication mode M2, if the mobile computer 9 becomes connected to the wireless communication part 22 through wireless communication, the mobile computer 9 becomes a so-called DHCP client, and the communication protocol controller 23 assigns an IP address to the mobile computer 9. Then, the communication protocol controller 23 notifies the mobile computer 9 of the assigned IP address, and also notifies the mobile computer 9 of a subnet mask, the IP address of a default gateway, and the IP address of a DNS (Domain Name System) server. In doing so, the communication protocol controller 23 of the multifunction peripheral 10 is designed to notify the mobile computer 9 of the IP address of the multifunction peripheral 10 itself as the IP address of the default gateway. Note that in this example, it is assumed that there is one DHCP client, but this invention is not limited to this, but there can be multiple DHCP clients.

In this manner, when the wireless communication part 22 operates in the communication mode M2, the communication protocol controller 23 performs processing as a DHCP server. The target of this processing is only the wireless communication network configured by the wireless communication part 22 operating in the communication mode M2 (SoftAP mode). That is, this processing is designed, for example, not to be performed to a network configured by the wireless communication part 22 operating in the communication mode M1 (infrastructure mode), and in the same manner, not to be performed to a wired communication network connected to the wired communication part 21.

Also, the network communication part 20 is configured so that it cannot perform communication between a network device (for example, the computer 31) connected to the wired communication part 21 and a network device (for example, the mobile computer 9) connected to the wireless communication part 22. Thereby, the wired LAN and the wireless LAN are designed to function as independent networks.

In this manner, the network communication part 20 is connected to network devices using the wired LAN and the wireless LAN. Then, when print data DP are transmitted from one of these network devices, if the transmission destination IP address of the print data DP matches with the IP address of the multifunction peripheral 10 itself, the network communication part 20 accepts the print data DP. Also, if the print data DP are transmitted from a network device having an IP address assigned in the communication mode M2, the network communication part 20 accepts the print data DP. That is, in this case, because the IP address of the multifunction peripheral 10 is set as the IP address of the default gateway in the network setting of this network device, this network device transmits the print data DP first to the multifunction peripheral 10. Therefore, the network communication part 20 is designed to accept these print data DP.

The setting management part 16 stores various kinds of settings of the devices and also performs modification, deletion, and management of these settings for example. The setting management part 16 stores an address conversion table 16A. The address conversion table 16A records in association the IP addresses of the transmission sources and the IP addresses of the transmission destinations of data received by the wireless communication part 22 in the communication mode M2. This address conversion table 16A is, as mentioned later, updated and used when the wireless communication part 22 operates in the communication mode M2.

The address conversion part 17 converts IP addresses using the address conversion table 16A. Specifically, as mentioned later, when the wireless communication part 22 operates in the communication mode M2 and transmits data using UDP to a network device (for example, the mobile computer 9), the address conversion part 17 converts the transmission source IP address of the data using the address conversion table 16A.

The control part 19 controls the operation of each block of the multifunction peripheral 10. The control part 19 comprises a processor for example, and performs various kinds of processing by executing software.

Specifically, the control part 19 controls the print part 14 so that once the network communication part 20 receives the print data DP, print process is performed based on the print data DP. That is, if the transmission destination IP address of the print data DP matches with the IP address of the multifunction peripheral 10 itself, because the print data DP should be printed by the multifunction peripheral 10, the print part 14 is controlled so as to perform a print process based on the print data DP. Also, it is designed so that if the print data DP are transmitted from a network device having an IP address assigned in the communication mode M2, the print part 14 is controlled so as to perform a print process based on the print data DP regardless of the transmission destination IP address of the print data DP. The assigned IP address may be stored in the control part, or the memory part.

Also, the control part 19 is also provided with a function to make the setting management part 16 update the address conversion table 16A based on the transmission source IP address and the transmission destination IP address of the print data DP if the print data DP are transmitted from a network device having its IP address assigned in the communication mode M2.

The mobile computer 9 is a notebook type personal computer for example, and comprises a CPU (Central Processing Unit), memory, a hard disk drive, various kinds of interfaces, a display part, a keyboard, etc. for example. The mobile computer 9 has a network communication part 9A. In this example, the network communication part 9A is designed to perform wireless communication with the wireless communication part 22 that operates as an access point when the wireless communication part 22 of the multifunction peripheral 10 operates in the communication mode M2 (SoftAP mode). The network communication part 9A performs communication using protocols such as TCP/IP and UDP. Also, this network communication part 9A has client functions such as LPR, Port 9100, IPP, SNMP, and DHCP. By this configuration, the network communication part 9A operates as a DHCP client and acquires the assigned IP address, the subnet mask, the IP address of the default gateway, and the IP address of the DNS server from the wireless communication part 22 of the multifunction peripheral 10. Thereby, it is designed so that the IP address of the multifunction peripheral 10 is set as the IP address of the default gateway in the network setting of the mobile computer 9.

This mobile computer 9 has a printer driver installed. In this printer driver, the IP address of a printer (for example, the multifunction peripheral 10) is set. By this configuration, once the user issues a print instruction by operating the mobile computer 9, the mobile computer 9 sets the IP address set in this printer driver as the transmission destination IP address, sets the IP address of the mobile computer 9 itself as the transmission source IP address, and transmits the print data DP.

Note that although the mobile computer 9 was used in this example, this invention is not limited to this, but various kinds of mobile terminals such as a smart phone and a tablet can be used.

The computer 31 is a desktop type personal computer for example, and comprises a CPU, memory, a hard disk drive, various kinds of interfaces, a display part, a keyboard, etc. for example in the same manner as the mobile computer 9. The computer 31 has a network communication part 31A. In this example, the network communication part 31A is designed to perform communication with the wired communication part 21 of the multifunction peripheral 10. The network communication part 31A performs communication using protocols such as TCP/IP and UDP. Also, this network communication part 31A has client functions such as LPR, Port 9100, IPP, SNMP, and DHCP. The IP address of the computer 31 is assigned by an unshown DHCP server connected to the network 30. In the network setting of this computer 31, the IP address of an unshown gateway connected to the network 30 is set as the IP address of the default gateway.

This computer 31 has a printer driver installed. In this printer driver, the IP address of a printer (for example, the multifunction peripheral 10) is set. By this configuration, once the user issues a print instruction by operating the computer 31, the computer 31 sets the IP address set in this printer driver as the transmission destination IP address, sets the IP address of the computer 31 itself as the transmission source IP address, and transmits print the data DP.

Here, the network communication part 20, the address conversion part 17, and the control part 19 correspond to a specific example of the "communication part" in this invention. The ID address of the default gateway corresponds to a specific example of the "management server address" in this invention. The print part 14 is a specific example that is able to develop latent image on medium using developer, and corresponds to the "processing part" in this invention. The mobile computer 9 corresponds to a specific example of the "first terminal device" in this invention. The print data DP transmitted from the mobile computer 9 correspond to a specific example of the "first information processing request" in this invention. The computer 31 corresponds to a specific example of the "second terminal device" in this invention. The print data DP transmitted from the computer 31 correspond to a specific example of the "second information processing request" in this invention. The setting management part 16 corresponds to a specific example of the "memory part" in this invention.

[Operations and Actions]

Next, explained are the operations and actions of the information processing system 1 of this embodiment.

[Outline Overall Operation]

First, explained referring to FIG. 1 is the overall operation outline of the information processing system 1. First, explained is the case where the mobile computer 9 transmits print data DP to the multifunction peripheral 10. In this case, first, the wireless communication part 22 of the multifunction peripheral 10 starts operating in the communication mode M2 (SoftAP mode), and the mobile computer 9 wirelessly connects to the wireless communication part 22. The communication protocol controller 23 assigns an IP address to the mobile computer 9. Then, the communication protocol controller 23 notifies the mobile computer 9 of the assigned IP address, and also notifies the mobile computer 9 of the subnet mask, the IP address of the default gateway, and the IP address of the DNS server. In doing so, the communication protocol controller 23 of the multifunction peripheral 10 notifies the mobile computer 9 of the IP address of the multifunction peripheral 10 itself as the IP address of the default gateway. Afterward, once the user issues a print instruction by operating the mobile computer 9, the mobile computer 9 sets the IP address set in the printer driver as the transmission destination IP address, also sets the IP address of the mobile computer 9 itself as the transmission source IP address, and transmits the print data DP.

Next, explained is the case where the computer 31 transmits print data DP to the multifunction peripheral 10. The IP address of the computer 31 is assigned by an unshown DHCP server connected to the network 30. In the computer 31, the IP address of the default gateway is set to the IP address of an unshown gateway connected to the network 30. Once the user issues a print instruction by operating the computer 31, the computer 31 sets the IP address set in the printer driver as the transmission destination IP address, also sets the IP address of the computer 31 itself as the transmission source IP address, and transmits the print data DP.

If the transmission destination IP address of the print data DP matches with the IP address of the multifunction peripheral 10 itself, the network communication part 20 of the multifunction peripheral 10 accepts the print data DP. Also, if the print data DP are transmitted from a network device having an IP address assigned in the communication mode M2, the network communication part 20 accepts the print data DP. The control part 19 controls the print part 14 based on the print data DP, and the print part 14 performs a print process based on an instruction from the control part 19. Also, if the print data DP are transmitted from a network device having an IP address assigned in the communication mode M2, the control part 19 controls the setting management part 16 based on the transmission source IP address and the transmission destination IP address of the print data DP so that the setting management part 16 updates the address conversion table 16A based on an instruction from the control part 19.

[Detailed Operations]

Next, explained in detail are the operations of the multifunction peripheral 10.

Figure 2:
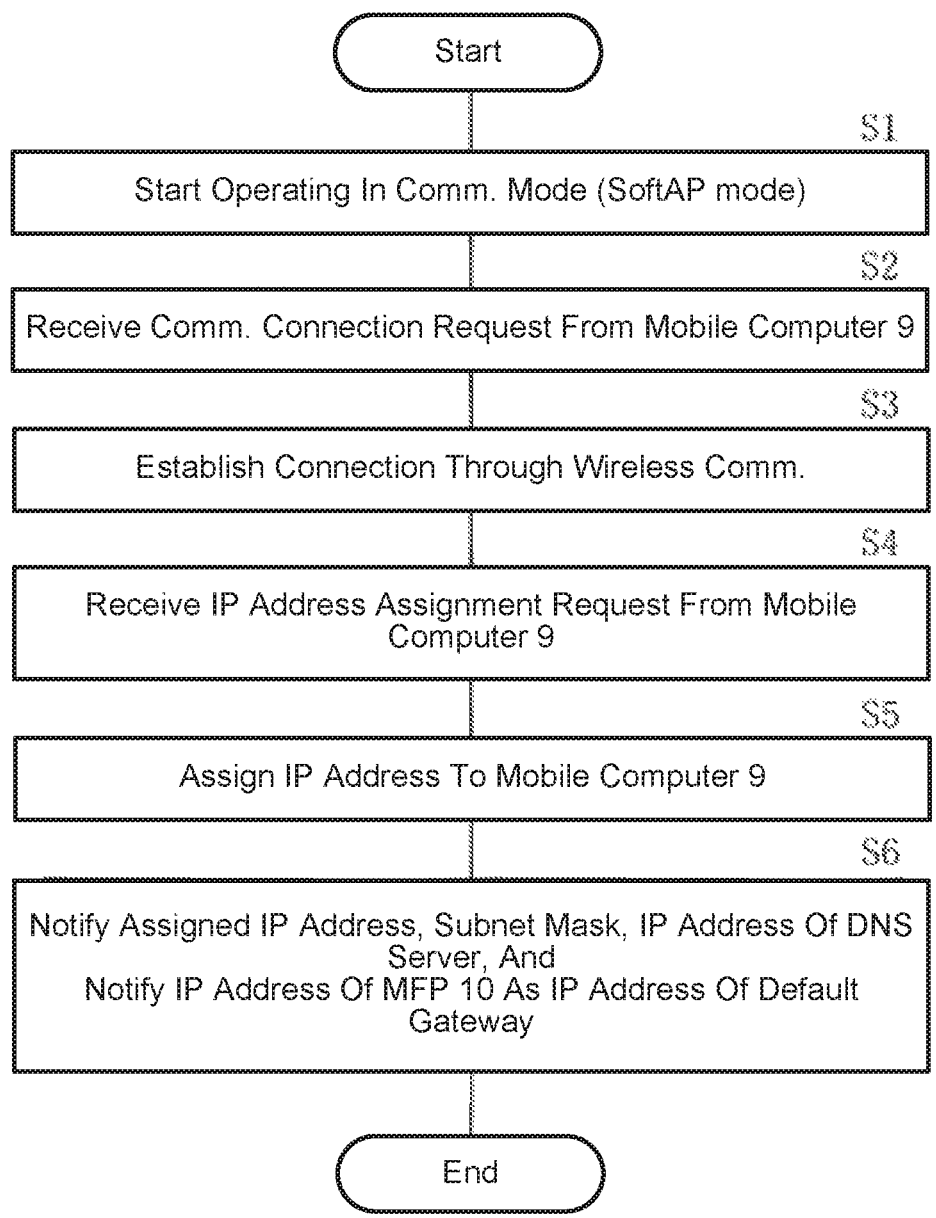
FIG. 2 is a flow chart showing an operation example of the multifunction peripheral shown in FIG. 1.

FIG. 2 shows an IP address assignment operation to the mobile computer 9 in the multifunction peripheral 10. The multifunction peripheral 10 first enables the SoftAP function, and afterward assigns an IP address to the mobile computer 9. Below, this operation is explained in detail.

First, the wireless communication part 22 of the multifunction peripheral 10 starts operating in the communication mode M2 (SoftAP mode) (S1). Specifically, the user issues an instruction to enable the SoftAP function by operating the operation part 11 of the multifunction peripheral 10. Based on the user's instruction, the control part 19 controls the wireless communication part 22 to start operating in the communication mode M2.

Next, the wireless communication part 22 receives a communication connection request from the network communication part 9A of the mobile computer 9 (S2). Specifically, for example, the user first examines the SSID (Service Set Identifier) of the wireless communication part 22 in advance by operating the operation part 11 of the multifunction peripheral 10 to display the SSID of the wireless communication part 22 on the display part 12. Then, the user operates the mobile computer 9 to specify the SSID of the wireless communication part 22 that operates as an access point. Thereby, the mobile computer 9 transmits the communication connection request to the wireless communication part 22. Then, the wireless communication part 22 receives this communication connection request.

Next, a connection through wireless communication is established between the network communication part 20 of the multifunction peripheral 10 and the network communication part 9A of the mobile computer 9 (S3).

Next, the network communication part 20 receives an IP address assignment request (S4). Specifically, the network communication part 9A of the mobile computer 9 transmits an IP address assignment request to the multifunction peripheral 10, and the network communication part 20 of the multifunction peripheral 10 receives this IP address assignment request.

Next, based on the control from the control part 19, the communication protocol controller 23 of the network communication part 20 assigns an IP address to the mobile computer 9 (S5). At this time, the communication protocol controller 23 records the assigned IP address in an assignment table 23A.

Then, the network communication part 20 notifies the mobile computer 9 of the IP address assigned in S5, the subnet mask, and the IP address of the DNS server, and also notifies the mobile computer 9 of the IP address of the multifunction peripheral 10 as the IP address of the default gateway (S6). Thereby, in the mobile computer 9, network setting is performed, and the IP address of the multifunction peripheral 10 is set as the IP address of the default gateway.

Through the above, the multifunction peripheral 10 finishes the IP address assignment to the mobile computer 9.

Figure 3:
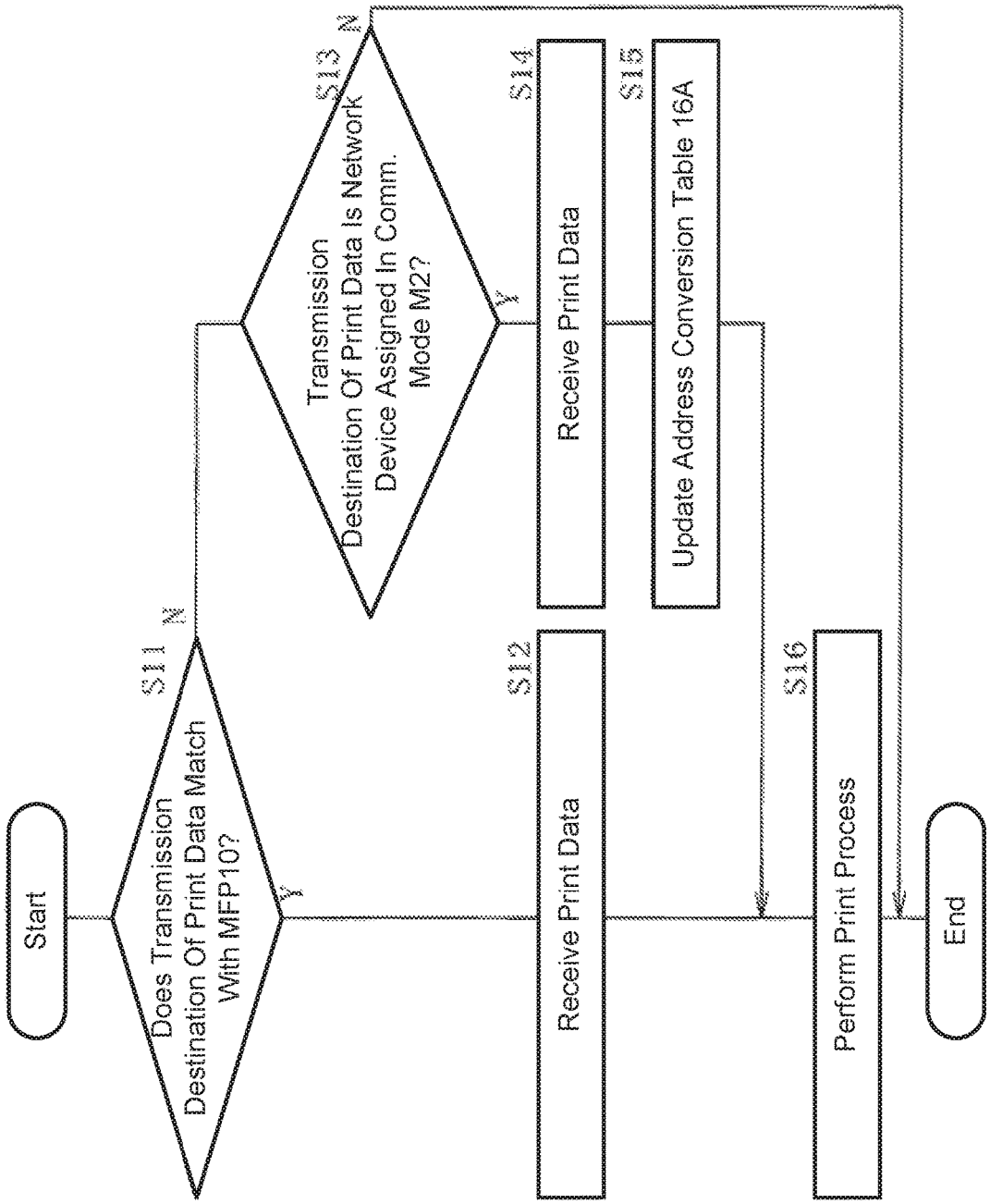
FIG. 3 is another flow chart showing an operation example of the multifunction peripheral shown in FIG. 1.

FIG. 3 shows an example processing based on print data DP in the multifunction peripheral 10. The multifunction peripheral 10 judges whether to receive the print data DP, and if the print data DP are received, performs a print process based on the received print data DP. Below, this operation is explained in detail.

First, the network communication part 20 of the multifunction peripheral 10 checks whether the transmission destination IP address of the print data DP matches with the IP address of the multifunction peripheral 10 itself (S11). If the transmission destination IP address of the print data DP matches with the IP address of the multifunction peripheral 10 itself ("Y" in S11), the network communication part 20 receives the print data DP (S12), then proceeds to S16.

In S11, if the transmission destination IP address of the print data DP does not match with the IP address of the multifunction peripheral 10 itself ("N" in S11), the network communication part 20 checks whether the transmission source IP address of the print data DP is the IP address of a network device having its IP address assigned in the communication mode M2 (S13). Specifically, the network communication part 20 checks whether the transmission source IP address of the print data DP is included in the assignment table 23A updated when the IP address was assigned in S5 in FIG. 2, thereby checking whether the transmission source IP address of the print data DP is the IP address of a network device having its IP address assigned in the communication mode M2. If it is not the IP address of a network device having its IP address assigned in the communication mode M2 ("N" in S13), this flow ends.

In S13, if the transmission source IP address of the print data DP is the IP address of a network device having its IP address assigned in the communication mode M2 ("Y" in S13), the network communication part 20 receives the print data DP (S14). Next, the control part 19 controls the setting management part 16 based on the transmission source IP address and the transmission destination IP address of the print data DP so that the setting management part 16 updates the address conversion table 16A (S15), then proceeds to S16.

Then, the control part 19 controls the print part 14 based on the print data DP so that the print part 14 performs a print process based on the print data DP (S16).

Through the above, the multifunction peripheral 10 finishes processing based on the print data DP.

Case where the Mobile Computer 9 Transmits Print Data DP

Next, explained are the specific operations of the information processing system 1 when the mobile computer 9 transmits print data DP. In this example, the IP address of the multifunction peripheral 10 in the wireless communication network configured by operating in the communication mode M2 (SoftAP mode) is "192.168.100.1". Also, the IP address assigned to the mobile computer 9 is "192.168.100.2". Also, the IP address of the printer that becomes the transmission destination of the print data DP is set to "10.49.100.1" in the printer drier of the mobile computer 9. This IP address is the IP address of another multifunction peripheral of the same model as the multifunction peripheral 10 for example.

Figure 4:
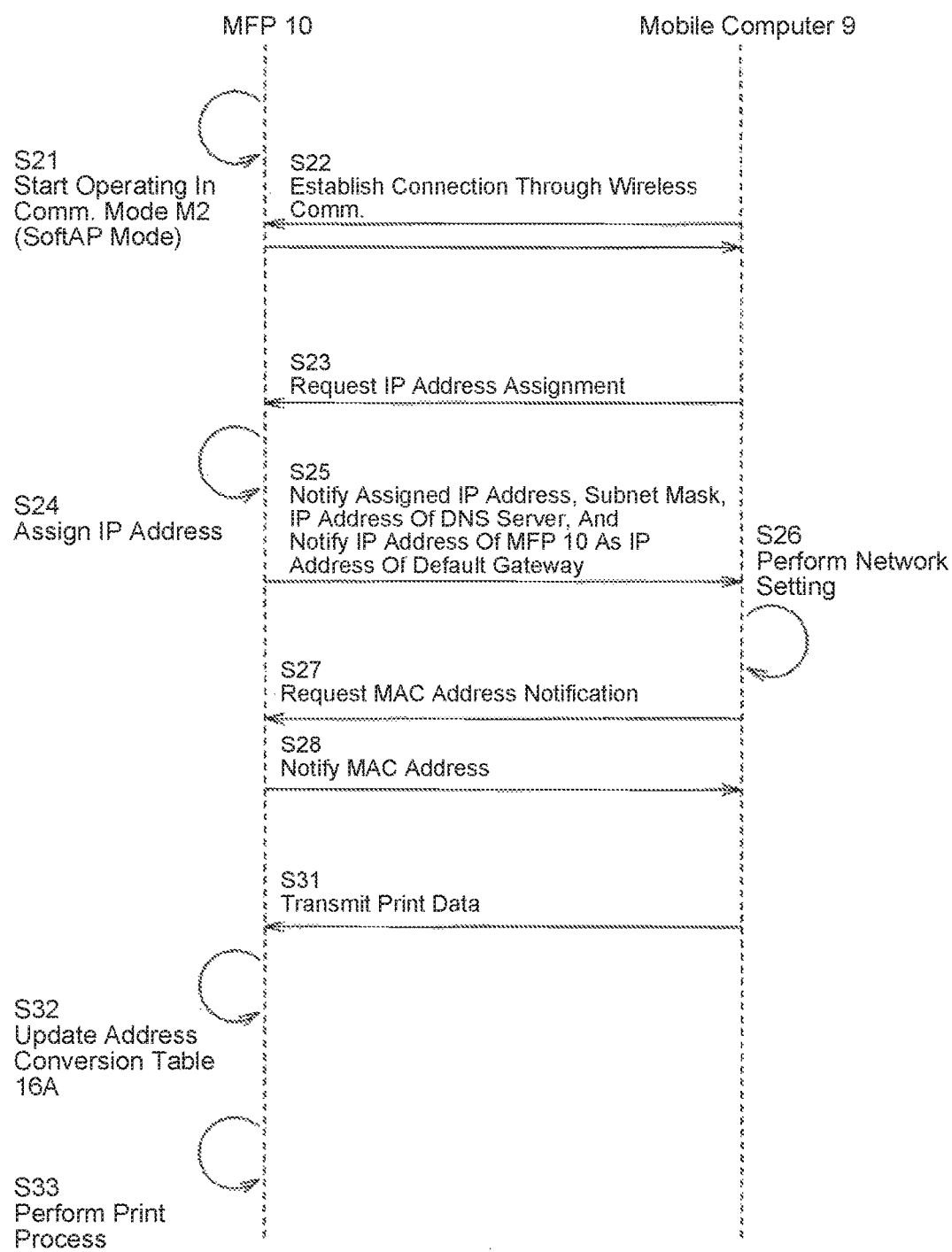
FIG. 4 is a sequence chart showing an operation example of the information processing system shown in FIG. 1.

Shown in FIG. 4 is an example sequence of the information processing system 1. In this information processing system 1, first, the wireless communication part 22 of the multifunction peripheral 10 starts operating in the communication mode M2 (SoftAP mode) (S21), and afterward a connection through wireless communication is established (S22). Next, the mobile computer 9 transmits an IP address assignment request to the multifunction peripheral 10 (S23). Then, the communication protocol controller 23 of the multifunction peripheral 10 assigns an IP address to the mobile computer 9 (S24), the network communication part 20 notifies the mobile computer 9 of the IP address assigned in S24, the subnet mask, and the IP address of the DNS server, and also notifies the mobile computer 9 of the IP address of the multifunction peripheral 10 as the IP address of the default gateway (S25). These operations correspond to S1-S6 shown in FIG. 2.

Next, the mobile computer 9 performs network setting based on the information obtained in S25 (S26). Specifically, in this network setting, the IP address of the mobile computer 9 is set to the assigned IP address ("192.168.100.2"), the subnet mask is set to the subnet mask that it was notified of in S25, and the IP address of the DNS server is set to the IP address of the DNS server that it was notified of in S25. Also, the IP address of the default gateway is set to the IP address ("192.168.100.1") of the multifunction peripheral 10.

Next, the mobile computer 9 transmits a MAC (Media Access Control) address notification request (S27). Specifically, the mobile computer 9 broadcasts the MAC address notification request of the multifunction peripheral 10 based on the IP address "192.168.100.1" of the multifunction peripheral 10 to the network configured by the wireless communication part 22 operating in the communication mode M2 (SoftAP mode). The wireless communication part 22 of the multifunction peripheral 10 receives this MAC address notification request.

Then, the network communication part 20 of the multifunction peripheral 10 notifies the mobile computer 9 of the MAC address of itself (S28).

Next, the mobile computer 9 transmits the print data DP to the multifunction peripheral 10 (S31). Specifically, first, the user issues a print instruction by operating the mobile computer 9. Thereby, the mobile computer 9 sets the IP address "10.49.100.1" set in the printer driver as the transmission destination IP address, also sets the IP address "192.168.100.2" of the mobile computer 9 itself as the transmission source IP address, and transmits the print data DP to the multifunction peripheral 10. That is, because the IP address of the default gateway is set to the IP address "192.168.100.1" of the multifunction peripheral 10 in the network setting of the mobile computer 9, the mobile computer 9 sets the MAC address acquired in S28 as the MAC address of the destination, and transmits the print data DP first to the multifunction peripheral 10 having that MAC address. Then, the network communication part 20 of the multifunction peripheral 10 receives the print data DP. In this example, the network communication part 20 receives the print data DP using Port 9100. That is, in this example, because the transmission destination IP address of the print data DP is not the IP address of the multifunction peripheral 10 ("N" in S11 in FIG. 3), and the transmission source of the print data DP is a network device having its IP address assigned in the communication mode M2 ("Y" in S13 in FIG. 3), the print data DP are received.

Next, based on an instruction from the control part 19, the setting management part 16 of the multifunction peripheral 10 updates the address conversion table 16A (S32). Specifically, based on the transmission source IP address and the transmission destination IP address of the print data DP, the setting management part 16 updates the address conversion table 16A.

FIG. 5 shows an example of the address conversion table 16A. In this address conversion table 16A, the transmission source IP address and the transmission destination IP address of data received by the wireless communication part 22 in the communication mode M2 are associated with each other. In this example, based on the transmission source IP address and the transmission destination IP address of the received print data DP, the IP address "192.168.100.2" of the transmission source and the IP address "10.49.100.1" of the transmission destination are recorded in association.

Then, based on an instruction from the control part 19, the print part 14 of the multifunction peripheral 10 performs a print process based on the print data DP (S33).

Through the above, processing based on the print data DP transmitted from the mobile computer 9 is finished.

In this manner, the information processing system 1 is designed so that if the received print data DP are transmitted from a network device having an IP address assigned in the communication mode M2, the multifunction peripheral 10 performs a print process based on the print data DP regardless of the transmission destination IP address of the print data DP, and therefore user's convenience can be enhanced. That is, for example, if the multifunction peripheral 10 is designed to perform a print process based on the print data DP only if the transmission destination IP address is the same as the IP address of the multifunction peripheral 10, the IP address setting of the print driver needs to be redone, costing a labor to the user. Especially, in this example, the user explicitly selects the multifunction peripheral 10 using the SSID and tries to make the multifunction peripheral 10 print. Therefore, by further forcing the IP address setting of the printer driver, the user's convenience could be damaged. On the other hand, because the multifunction peripheral 10 is designed to perform a print process based on the print data DP regardless of the transmission destination IP address of the print data DP, it can save the labor of redoing the IP address setting of the printer driver, and therefore the user's convenience can be enhanced.

Also, the information processing system 1 is designed so that when the multifunction peripheral 10 assigns an IP address to the mobile computer 9 in the communication mode M2, the mobile computer 9 is notified of the IP address of the multifunction peripheral 10 as the IP address of the default gateway. Thereby, in the network setting of the mobile computer 9, the IP address of the default gateway is set to the IP address "192.168.100.1" of the multifunction peripheral 10. Therefore, when transmitting the print data DP, the mobile computer 9 tries to make the multifunction peripheral 10 relay the data, and therefore transmits the print data DP first to the multifunction peripheral 10. As the result, regardless of the transmission destination IP address of the print data DP, the multifunction peripheral 10 can receive the print data DP and perform a print process based on the print data DP, and therefore the user's convenience can be enhanced.

Also, because the information processing system 1 is designed so that the multifunction peripheral 10 notifies the mobile computer 9 of the IP address of the multifunction peripheral 10 as the IP address of the default gateway, a simple configuration can be realized. That is, for example, if it is configured so that data including the IP address of the multifunction peripheral 10 are transmitted to the mobile computer 9, the mobile computer 9 analyzes the data, and the network setting is performed based on the analysis result, software and/or hardware dedicated to the mobile computer 9 could become necessary. On the other hand, the information processing system 1 is designed to notify the mobile computer 9 of the IP address of the multifunction peripheral 10 as the IP address of the default gateway. Thereby, as the mobile computer 9, the one having a general configuration can be used as it is, and therefore a simple configuration can be realized.

Next, explained is the exchange of data other than print data DP in the communication mode M2. If the mobile computer 9 wants to acquire the status of the multifunction peripheral 10 for example, it transmits an SNMP request to the multifunction peripheral 10 using UDP. Then, using UDP, the multifunction peripheral 10 transmits an SNMP response including the status of the multifunction peripheral 10 itself to the mobile computer 9.

Figure 6:
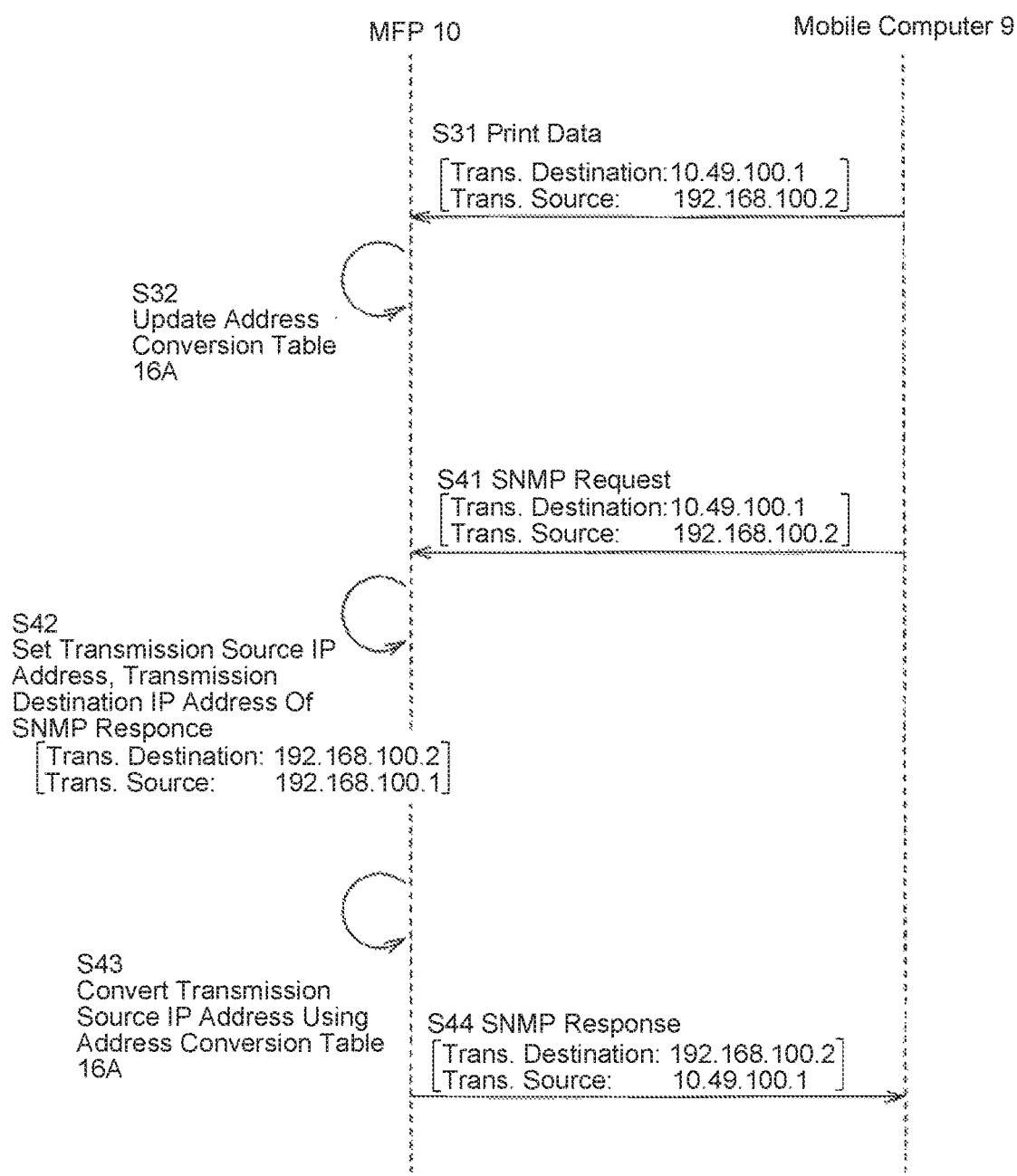
FIG. 6 is another sequence chart showing an operation example of the information processing system shown in FIG. 1.

FIG. 6 shows an example exchange of an SNMP request and an SNMP response. In this example, in the same manner as in FIG. 4, the network communication part 20 receives print data DP (S31), and the setting management part 16 updates the address conversion table 16A (S32). In this example, the transmission destination IP address of the print data DP is "10.49.100.1", and the transmission source IP address is "192.168.100.2". Therefore, as shown in FIG. 5, in the address conversion table 16A, the IP address "192.168.100.2" of the transmission source and the IP address "10.49.100.1" of the transmission destination are recorded in association.

Afterward, the network communication part 9A of the mobile computer 9 transmits an SNMP request to the multifunction peripheral 10 (S41). The transmission destination IP address of this SNMP request is "10.49.100.1", and the transmission source IP address is "192.168.100.2". That is, the transmission destination IP address of the SNMP request is the same as the transmission destination IP address of the print data DP, and the transmission source IP address of the SNMP request is the same as the transmission source IP address of the print data DP.

Next, prior to transmitting an SNMP response, based on an instruction from the control part 19, the communication protocol controller 23 of the multifunction peripheral 10 sets the transmission source IP address and the transmission destination IP address of the SNMP response (S42). Specifically, in this example, the communication protocol controller 23 sets the IP address "192.168.100.2" of the mobile computer 9 as the transmission destination IP address of the SNMP response, and sets the IP address "192.168.100.1" of the multifunction peripheral 10 as the transmission source IP address of the SNMP response.

Next, based on an instruction from the control part 19, using the address conversion table 16A, the address conversion part 17 of the multifunction peripheral 10 converts the transmission source IP address of the SNMP response (S43). Specifically, using the address conversion table 16A, the address conversion part 17 first acquires the IP address "10.49.100.1" associated with the IP address "192.168.100.2" of the transmission destination of the SNMP response set in S42. Then, the address conversion part 17 replaces the IP address "192.168.100.1" of the transmission source of the SNMP response set in S42 with the IP address "10.49.100.1" acquired in this manner, thereby explicitly setting the transmission source IP address.

Then, the network communication part 20 of the multifunction peripheral 10 transmits the SNMP response (S44). Specifically, using the IP address "10.49.100.1" of the transmission source substituted in S43, the network communication part 20 transmits the SNMP response to the mobile computer 9.

In this manner, the mobile computer 9 can acquire the status of the multifunction peripheral 10.

In this manner, because the information processing system 1 is designed so that the transmission source IP address of an SNMP response is converted using the address conversion table 16A, an appropriate operation can be realized. That is, because UDP is connectionless-type communication, when the multifunction peripheral 10 transmits an SNMP response, if it sets the transmission source IP address to the IP address "192.168.100.1" of itself, the transmission destination IP address of the SNMP request (S41) and the transmission source IP address of the SNMP response (S44) do not match, possibly inducing the occurrence of a malfunction. On the other hand, the information processing system 1 is designed to convert the transmission source IP address of an SNMP response using the address conversion table 16A. Thereby, in the information processing system 1, because the transmission destination IP address of the SNMP request (S41) and the transmission source IP address of the SNMP response (S44) can be matched, the possibility of a malfunction occurring can be reduced, and as the result, an appropriate operation can be realized.

Case where the Computer 31 Transmits Print Data DP

Next, explained are the specific operations of the information processing system 1 when the computer 31 transmits print data DP through wired communication. In this example, the IP address of the multifunction peripheral 10 in the wired communication network is "192.168.200.1". The IP address of the computer 31 is "192.168.200.10". Also, in the printer driver of the computer 31, the IP address of the printer is set to "192.168.200.1".

Figure 7:
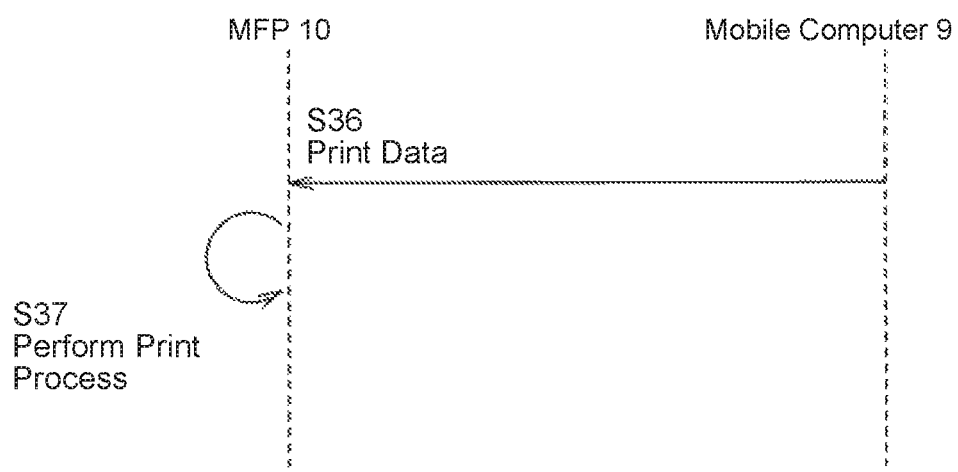
FIG. 7 is another sequence chart showing an operation example of the information processing system shown in FIG. 1.

FIG. 7 shows an example sequence of the information processing system 1 for performing a print process based on print data DP transmitted from the computer 31. In this example, the network setting of the computer 31 is already complete at the point of time when the computer 31 becomes connected to the network 30.

First, the computer 31 transmits the print data DP to the multifunction peripheral 10 using the network 30 (S36). Specifically, first, the user issues a print instruction by operating the computer 31. Thereby, the computer 31 sets the IP address "192.168.200.1" set in the printer driver as the transmission destination IP address, also sets the IP address "192.168.200.10" of the computer 31 itself as the transmission source IP address, and transmits the print data DP. Then, the network communication part 20 of the multifunction peripheral 10 accepts these print data DP because the transmission destination IP address of these print data DP matches with the IP address of the multifunction peripheral 10 itself. In this example, the network communication part 20 receives these print data DP using Port 9100. Note that in this example, because the transmission destination IP address of these print data DP matches with the IP address of the multifunction peripheral 10 ("Y" in S11 in FIG. 3), the address conversion table 16A is not updated.

Then, based on an instruction from the control part 19, the print part 14 of the multifunction peripheral 10 performs a print process based on these print data DP (S37).

In this manner, when the computer 31 has transmitted print data DP through wired communication, the information processing system 1 receives the print data DP based on the transmission destination IP address of the print data DP and performs a print process based on the print data DP.

Effects

In this manner, because this embodiment is designed so that if received print data are transmitted from a network device having an IP address assigned in the communication mode M2, regardless of the transmission destination IP address of the print data, a print process is performed based on the print data, the labor of redoing the setting of the IP address in the printer driver can be saved for example, and therefore the user's convenience can be enhanced.

Because this embodiment is designed so that when assigning an IP address in the communication mode M2, the mobile computer is notified of the IP address of the multifunction peripheral as the IP address of the default gateway, regardless of the transmission destination IP address of the print data, a print process can be performed based on the print data, and therefore the user's convenience can be enhanced.

Because this embodiment is designed to convert the transmission source IP address of an SNMP response using the address conversion table, the possibility of a malfunction occurring can be reduced, and as the result, an appropriate operation can be realized.

[Modification 1-1]

Although the above-mentioned embodiment is designed so that if received print data DP are transmitted from a network device having an IP address assigned in the communication mode M2, the multifunction peripheral 10 performs a print process based on the print data DP regardless of the transmission destination IP address of the print data DP, this invention is not limited to this. Instead of this or together with this, the multifunction peripheral 10 can be designed so that if the port number for receiving the print data DP is the predetermined port number, regardless of the transmission destination IP address of the print data DP, a print process is performed based on the print data DP. Also, instead of this or together with this, the multifunction peripheral 10 can be designed so that if the protocol for receiving the print data DP is the predetermined protocol, regardless of the transmission destination IP address of the print data DP, a print process is performed based on the print data DP. In those embodiments, the multifunction peripheral may send the port number to the terminal. The port number and the protocol may be determined in accordance with a design specification of the multifunction peripheral, or based on multifunction peripheral settings.

[Modification 1-2]

Although in the above-mentioned embodiment, the communication mode M1 (infrastructure mode) is disabled, this invention is not limited to this, but instead, the communication mode M1 can be enabled. In this case, for example, the network communication part 20 performs wireless communication with network devices by operating in the communication mode M1. Then, the network communication part 20 enables the SoftAP function as necessary, and receives print data DP transmitted from the mobile computer 9 for example.

[Modification 1-3]

Although the above-mentioned embodiment was provided with the address conversion part 17 that performs an address conversion using the address conversion table 16A, this invention is not limited to this, but instead, it need not be provided with the address conversion part 17 for example only if all print data sent to the multifunction peripheral are expected to be printed. Even in this case, the multifunction peripheral 10 can perform a print process based on print data DP transmitted from the mobile computer 9.

[Modification 1-4]

Although in the above-mentioned embodiment, this technology was applied to the multifunction peripheral 10, it is not limited to this, but instead, it can be applied to a printer, an all-in-one machine, a copier, etc. for example.

2. Second Embodiment

Next, explained is an information processing system 2 of the second embodiment. This embodiment differs from the above-mentioned first embodiment in the method to convey IP addresses to the mobile computer 9. Note that the same codes are given to the components that are substantially identical to those of the information processing system 1 of the above-mentioned first embodiment, and their explanations are omitted.

Figure 8:
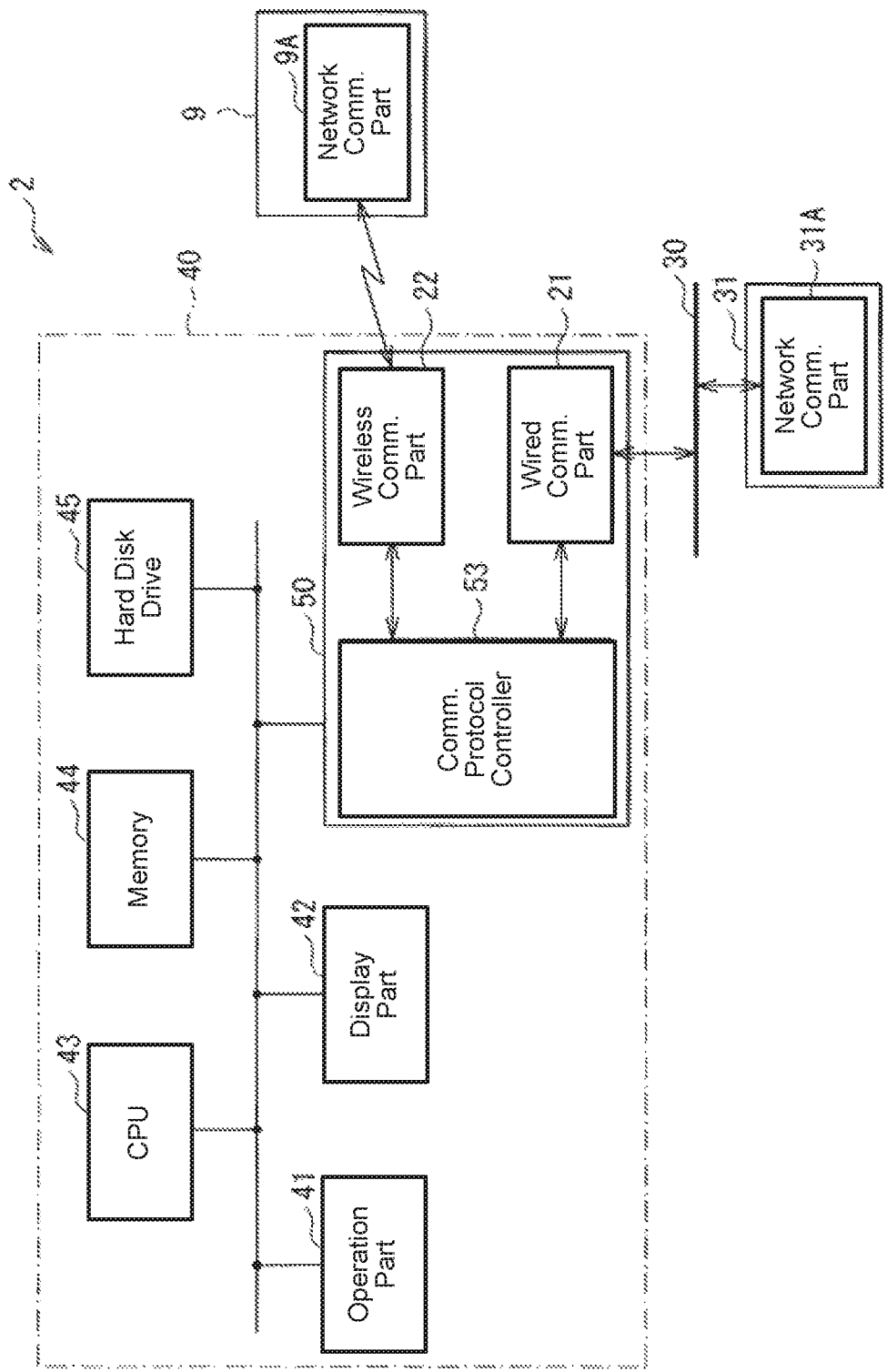
FIG. 8 is a block diagram showing a configuration example of the information processing system of the second embodiment.

FIG. 8 shows an example configuration of the information processing system 2 of the second embodiment. The information processing system 2 is provided with a server 40, a mobile computer 9, and a computer 31.

The server 40 performs information processing based on an information processing request from a network device such as the mobile computer 9 and the computer 31. Although the information processing can be either processing as a digital media server, various kinds of image processing, or processing as a file server for example, this invention is not limited to this. The server 40 has an operation part 41, a display part 42, a CPU 43, memory 44, and a hard disk drive 45.

The operation part 41 accepts a user's operation, and is configured using a keyboard, a mouse, etc. for example. The display part 42 displays the status of the server 40 etc., and is configured using a liquid crystal display etc. for example. The CPU 43 executes various kinds of programs for realizing the functions of the server 40. The memory 44 temporarily stores data in executing various kinds of programs. The hard disk drive 45 stores various kinds of programs for realizing the functions of the server 40.

A network communication part 50 has a communication protocol controller 53. The communication protocol controller 53 controls communication using various kinds of protocols in the same manner as the communication protocol controller 23 of the above-mentioned first embodiment.

Also, when the wireless communication part 22 operates in the communication mode M2 (SoftAP mode), the communication protocol controller 53 performs processing as a so-called DHCP server. Specifically, when the wireless communication part 22 operates in the communication mode M2, if the mobile computer 9 becomes connected to the wireless communication part 22 through wireless communication, the mobile computer 9 becomes a so-called DHCP client, and the communication protocol controller 53 assigns an IP address to the mobile computer 9. Then, the communication protocol controller 53 notifies the mobile computer 9 of the assigned IP address, and also notifies the mobile computer 9 of a subnet mask, the IP address of a default gateway, and the IP address of a DNS server. In doing so, the communication protocol controller 53 of the server 40 notifies the mobile computer 9 of the IP address of the server 40 itself as the IP address of the DNS server.

Also, when the wireless communication part 22 operates in the communication mode M2, the communication protocol controller 53 also performs processing as a so-called DNS server. Specifically, when the wireless communication part 22 operates in the communication mode M2, if the mobile computer 9 inquires of the server 40 the IP address corresponding to a certain host name, the communication protocol controller 53 has a function to reply with the IP address of the server 40 itself regardless of the host name. That is, the communication protocol controller 53 replies with the same IP address regardless of the host name.

The network communication part 50 becomes connected to network devices using a wired LAN and/or a wireless LAN in the same manner as the network communication part 20 of the above-mentioned first embodiment. Then, when an information processing request RQ specifying a host name is transmitted from one of these network devices, if the host name matches with the host name of the server 40 itself, the network communication part 50 accepts the information processing request RQ. Also, if the information processing request RQ specifying a host name was transmitted from a network device having an IP address assigned in the communication mode M2, the network communication part 50 accepts the information processing request RQ. That is, in this case, because the IP address of the server 40 is set as the IP address of the DNS server in the network setting of this network device, this network device inquires of the server 40 the IP address corresponding to the host name. Then, the network communication part 50 replies with the IP address of the server 40 itself. Thereby, this network device sets this IP address of the server 40 itself as the transmission destination IP address, and transmits the information processing request RQ. As the result, the network communication part 50 accepts this information processing request RQ.

The network communication part 9A of the mobile computer 9 operates as a DHCP client, and acquires from the wireless communication part 22 the assigned IP address, the subnet mask, the IP address of the default gateway, and the IP address of the DNS server. Thereby, it is designed so that the IP address of the server 40 is set as the IP address of the DNS server in the network setting of the mobile computer 9.

Also, the IP address of the computer 31 is assigned by an unshown DHCP server connected to the network 30. In this computer 31, the IP address of the DNS server is set to the IP address of an unshown DNS server connected to the network 30.

Here, the network communication part 50 corresponds to a specific example of the "communication part" in this invention. The IP address of the DNS server corresponds to a specific example of the "management server address" in this invention. The CPU 43 corresponds to a specific example of the "processing part" in this invention. The information processing request RQ transmitted from the mobile computer 9 corresponds to a specific example of the "first information processing request" in this invention. The information processing request RQ transmitted from the computer 31 corresponds to a specific example of the "second information processing request" in this invention.

Figure 9:
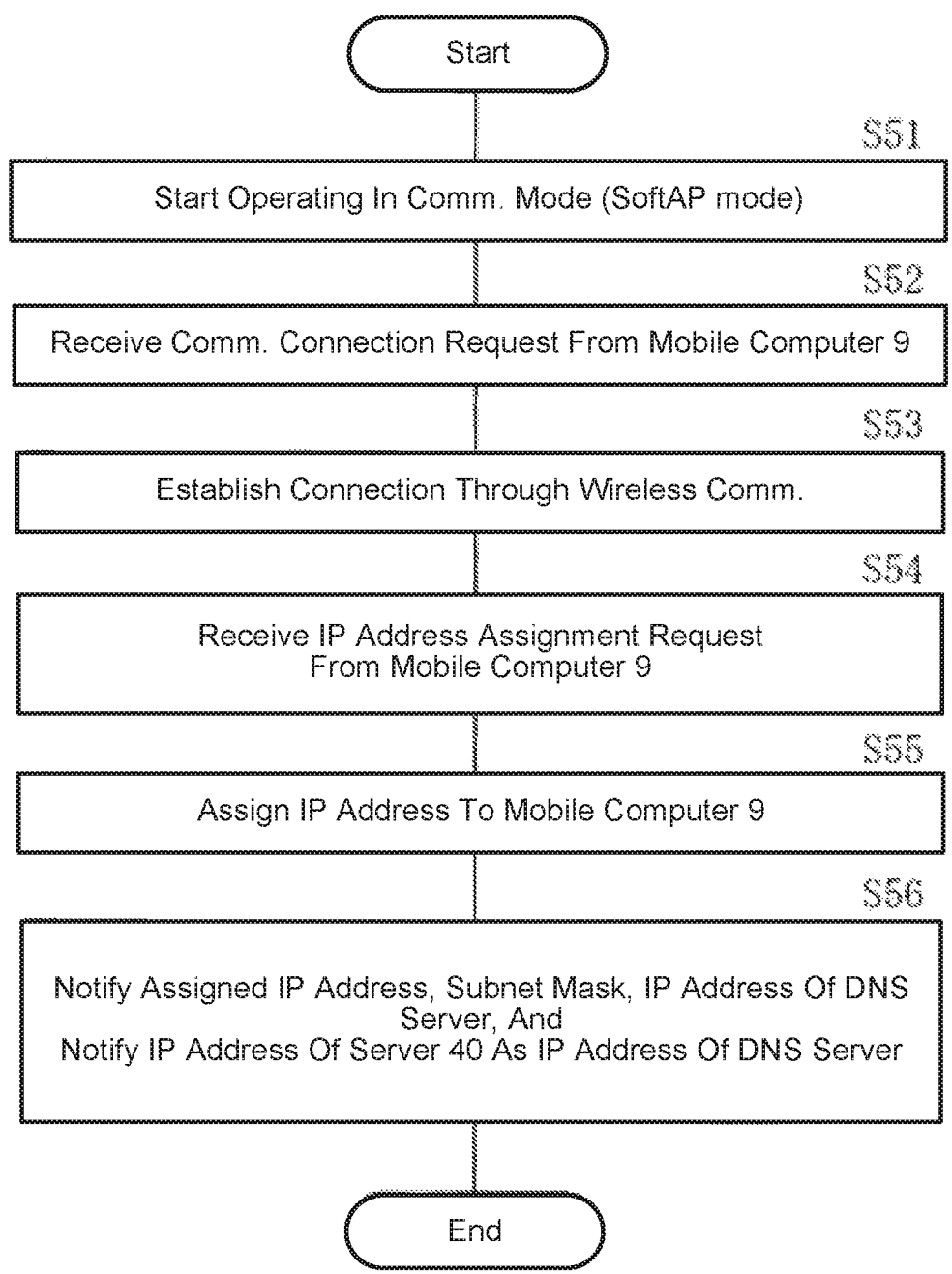
FIG. 9 is a flow chart showing an operation example of the server shown in FIG. 8.

FIG. 9 shows an IP address assignment operation to the mobile computer 9 in the server 40.

In the same manner as in the above-mentioned first embodiment (FIG. 2), first, the wireless communication part 22 of the server 40 starts operating in the communication mode M2 (SoftAP mode) (S51). Next, the wireless communication part 22 receives a communication connection request from the network communication part 9A of the mobile computer 9 (S52), establishing a connection through wireless communication (S53).

Next, the network communication part 50 receives an IP address assignment request (S54), and the communication protocol controller 53 of the network communication part 50 assigns an IP address to the mobile computer 9 (S55).

Then, the network communication part 50 notifies the mobile computer 9 of the IP address assigned in S55, the subnet mask, and the IP address of the default gateway, and also notifies the mobile computer 9 of the IP address of the server 40 as the IP address of the DNS server (S56). Thereby, in the mobile computer 9, network setting is performed, and the IP address of the server 40 is set as the IP address of the DNS server.

Through the above, the server 40 finishes the IP address assignment to the mobile computer 9.

Case where the Mobile Computer 9 Transmits an Information Processing Request RQ

Next, explained are the specific operations of the information processing system 2 in the case where the mobile computer 9 transmits an information processing request RQ. In this example, the IP address of the server 40 in a wireless communication network configured by operating in the communication mode M2 (SoftAP mode) is "192.168.100.1". Also, the IP address assigned to the mobile computer 9 is "192.168.100.2".

Figure 10:
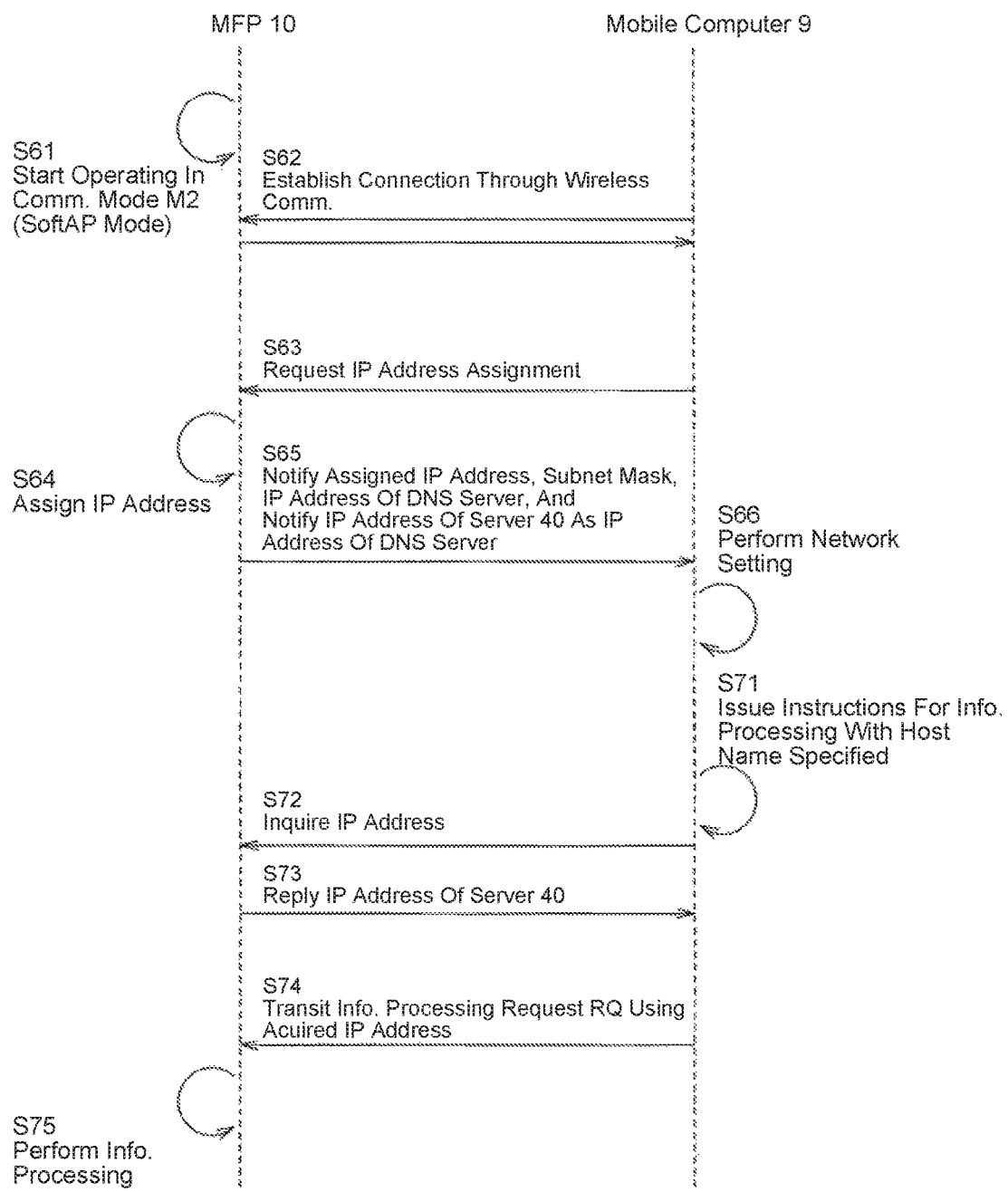
FIG. 10 is a sequence chart showing an operation example of the information processing system shown in FIG. 8.

FIG. 10 shows an example sequence of the information processing system 2. In the information processing system 2, first, the wireless communication part 22 of the server 40 starts operating in the communication mode M2 (SoftAP mode) (S61), and afterward a connection through wireless communication is established (S62). Next, the mobile computer 9 transmits an IP address assignment request to the server 40 (S63). Then, the communication protocol controller 53 of the server 40 assigns an IP address to the mobile computer 9 (S64), the network communication part 50 notifies the mobile computer 9 of the IP address assigned in S64, the subnet mask, and the IP address of the default gateway, and also notifies the mobile computer 9 of the IP address of the server 40 as the IP address of the DNS server (S65). These operations correspond to S51-S56 shown in FIG. 9.

Next, the mobile computer 9 performs network setting based on information obtained in S65 (S66). Specifically, in this network setting, the IP address of the mobile computer 9 is set to the assigned IP address ("192.168.100.2"), the subnet mask is set to the subnet mask that it was notified of in S65, and the IP address of the default gateway is set to the IP address of the default gateway that it was notified of in S65. Also, the IP address of the DNS server is set to the IP address ("192.168.100.1") of the server 40.

Next, by operating the mobile computer 9, the user issues an instruction for information processing with a host name specified (S71). In this example, the specified host name is the host name of another server that is different from the server 40.

Next, the mobile computer 9 inquires of the server 40 the IP address corresponding to the host name specified in S71 (S72). That is, because in the network setting of the mobile computer 9, the IP address of the DNS server is set to the IP address "192.168.100.1" of the server 40, the mobile computer 9 inquires of the server 40 that functions as a DNS server the IP address.

Next, the network communication part 50 of the server 40 replies with the IP address of the server 40 itself (S73). That is, the network communication part 50 replies with the same IP address "192.168.100.1" regardless of the host name specified in S71.

Next, the mobile computer 9 sets the IP address "192.168.100.1" acquired in S73 as the transmission destination IP address, and transmits an information processing request RQ according to the instruction in S71 (S74). That is, the mobile computer 9 transmits the information processing request RQ to the server 40. Then, the network communication part 50 of the server 40 receives this information processing request RQ.

Then, based on this information processing request RQ, the CPU 43 of the server 40 performs information processing (S75).

Through the above, processing based on the information processing request RQ transmitted from the mobile computer 9 is finished.

In this manner, because the server 40 is designed so that if the received information processing request RQ is transmitted from a network device having an IP address assigned in the communication mode M2, information processing is performed based on the information processing request RQ regardless of the host name specified by the user, the user's convenience can be enhanced. That is, for example, if it is designed so that only when the specified host name is the same as the host name of the server 40, the server 40 performs information processing based on the information processing request RQ, the correct host name needs to be inputted or selected, costing a labor to the user. On the other hand, because the server 40 is designed to perform information processing based on the information processing request RQ regardless of the specified host name, the labor of inputting or selecting the correct host name can be saved, and therefore the user's convenience can be enhanced.

Also, the information processing system 2 is designed so that when assigning an IP address to the mobile computer 9 in the communication mode M2, the server 40 notifies the mobile computer 9 of the IP address of the server 40 as the IP address of the DNS server. Thereby, in the network setting of the mobile computer 9, the IP address of the DNS server is set to the IP address "192.168.100.1" of the server 40, and the mobile computer 9 inquires of the server 40 an IP address. Then, when replying to the IP address inquiry, the server 40 is designed to reply with the IP address of the server 40 regardless of the host name specified by the user. Thereby, the mobile computer 9 receives the IP address of the server 40 as the reply to the IP address inquiry, and transmits an information processing request RQ to the server 40 based on this IP address. As the result, because the server 40 can receive the information processing request RQ regardless of the host name specified by the user and can perform information processing based on this information processing request RQ, the user's convenience can be enhanced.

Also, because the information processing system 2 is designed so that the server 40 notifies the mobile computer 9 of the IP address of the server 40 itself as the IP address of the DNS server and also replies to the IP address inquiry with the IP address of the server 40 itself, a simple configuration can be realized. That is, for example, if configured so that data including the IP address of the server 40 are transmitted to the mobile computer 9, and the mobile computer 9 analyzes the data and transmits an information processing request RQ to the server 40 based on the analysis result, software and/or hardware dedicated to the mobile computer 9 could become necessary. On the other hand, the information processing system 2 is designed to notify the mobile computer 9 of the IP address of the server 40 itself as the IP address of the DNS server, and reply to the IP address inquiry with the IP address of the server 40 itself. Thereby, as the mobile computer 9, the one having a general configuration can be used as it is, and therefore a simple configuration can be realized.

As shown above, because this embodiment is designed so that if an information processing request is transmitted from a network device having an IP address assigned in the communication mode M2, information processing is performed based on the information processing request regardless of the host name specified by the user, the labor of inputting or selecting the correct host name can be saved for example, and therefore the user's convenience can be enhanced This embodiment is designed so that when assigning an IP address in the communication mode M2, the mobile computer is notified of the IP address of the server as the IP address of the DNS server. Further, it is designed to reply to an IP address inquiry accompanying an information processing request with the IP address of the server itself. Thereby, because information processing can be performed based on the information processing request regardless of the host name specified by the user, the user's convenience can be enhanced.

[Modification 2-1]

Although in the above-mentioned embodiment, this technology was applied to the server 40, but it is not limited to this, but instead of this, for example, it can also be applied to a multifunction peripheral in the same manner as in the above-mentioned first embodiment.

Although this invention was explained citing several embodiments and modifications in the above, this invention is not limited to these embodiments etc., but various modifications are possible.

For example, although the wired communication part 21 was provided in the above-mentioned embodiments etc., this invention is not limited to this, but instead of this, for example, the wired communication part 21 need not be provided.

Also, although in the above-mentioned embodiments etc., when assigning an IP address to the mobile computer 9, for example, multifunction peripheral 10 transmits the IP address of itself as the IP address of the default gateway, and the server 40 transmits the IP address of itself as the IP address of the DNS server, this invention is not limited to these. In this invention, the above IP address of multifunction peripheral 10 is an example of self-address. Instead, for example, the multifunction peripheral 10 and the server 40 can transmit the IP addresses of themselves as the IP addresses of various kinds of management servers that are currently used or can be used in future on the Internet.

That is, once the multifunction peripheral 10 notifies the mobile computer 9 of the IP address of itself as the management server address, the mobile computer 9 performs an address (MAC address or IP address) notification request to the multifunction peripheral 10. Then, based on the acquired address, the mobile computer 9 can transmit print data DP to the multifunction peripheral 10. Also, once the server 40 notifies the mobile computer 9 of the IP address of itself as the management server address, the mobile computer 9 performs an address (MAC address or IP address) notification request to the server 40. Then, based on the acquired address, the mobile computer 9 can transmit an information processing request RQ to the server 40.

What is claimed is:

1. An information processing device communicating with a first terminal device through either a wired or wireless network, comprising:
   a communication part that
      transmits a self-address of itself as a management server address to the first terminal device, the self-address being a unique code to identify the information processing device in the network, and
      receives a first information processing request, which is to cause the information processing device to perform an information processing, and a request destination information, which indicates a request destination of the first information processing request, both of the requests being transmitted from the first terminal device, and
   a processing part that performs the information processing based on the first information processing request regardless of the request destination indicated by the request destination information.

2. The information processing device according to claim 1, further comprising:
   a control part that establishes a communication with the first terminal device, wherein
   when receiving a communication request from the first terminal device, the control part creates a destination address that is the request destination information and a unique code assigned to the first terminal device, and
   when receiving the first information processing request, the control part checks a destination address and source address that are transmitted together with the first information processing request, the source address identifying from which device the first information processing request was transmitted,
   when the destination address is identical to the self-address, the control part causes the communication part to receive the first information processing request and causes the processing part to perform the information processing,
   even when the destination address is not identical to the self-address, but when the source address is identical to the destination address that was created in correspondence with the communication request, the control part causes the communication part to receive the first information processing request and causes the processing part to perform the information processing,
   when the destination address is not identical to the self-address and the source address is not identical to the destination address, the control part does not cause the communication part to receive the first information processing request.

3. The information processing device according to claim 1, wherein
   the communication part
      receives an address acquisition request transmitted from the first terminal device,
      assigns an address according to the address acquisition request, and
      transmits the assigned address to the first terminal device when sending the self-address as the management server address.

4. The information processing device according to claim 1, further comprising:
   a second terminal device that is either wired or wirelessly connected to the information processing device, wherein
   when a request destination of a second information processing request transmitted from the second terminal device having another management server address set to a second address is the information processing device, the communication part receives the second information processing request, and
   the processing part performs information processing based on the second information processing request.

5. The information processing device according to claim 1, wherein
   when the communication part receives the first information processing request at a predetermined port, the processing part performs information processing based on the first information processing request regardless of the request destination indicated by the request destination information.

6. The information processing device according to claim 1, wherein
   when the communication part receives the first information processing request through a predetermined protocol, based on the first information processing request, the processing part performs information processing regardless of the request destination indicated by the request destination information.

7. The information processing device according to claim 1, wherein
   the management server address is the IP address of a gateway.

8. The information processing device according to claim 7, wherein
   the request destination information is an IP address.

9. The information processing device according to claim 1, wherein
   the management server address is the IP address of a DNS server.

10. The information processing device according to claim 9, wherein
    the request destination information is a host name.

11. The information processing device according to claim 10, wherein
    based on the host name, the communication part transmits the self-address as the address of itself to the first terminal device.

12. The information processing device according to claim 1, further comprising a memory part, wherein
    together with the first information processing request and the request destination information, the first terminal device further transmits a request source information indicating the request source of the first information processing request,
    the communication part further receives the request source information, and
    the memory part stores table information indicating the association of the request source information and the request destination information.

13. The information processing device according to claim 12, wherein based on the table information, the communication part sets a transmission source address when transmitting information to the first terminal device.

14. The information processing device according to claim 1, wherein the communication part transmits the self-address as the management server address to the first terminal device through wireless communication, and also receives the first information processing request and the request destination information from the first terminal device.

15. The information processing device according to claim 14, wherein the communication part performs the wireless communication by functioning as a wireless access point.

16. The information processing device according to claim 1, wherein the processing part is an image forming part, and
the first information processing request is an image forming processing request.

17. An information processing system, comprising:
an information processing device; and
a first terminal device, wherein
the information processing device comprises
a communication part that transmits a self-address of itself as a management server address to the first terminal device, and also receives a first information processing request and request destination information, which indicates a request destination of the first information processing request, both of the requests being transmitted from the first terminal device, and
a processing part that performs information processing based on the first information processing request regardless of the request destination indicated by the request destination information.

* * * * *